(12) United States Patent
Xu et al.

(10) Patent No.: US 12,127,178 B2
(45) Date of Patent: Oct. 22, 2024

(54) RADIO COMMUNICATION METHOD, NETWORK DEVICE, AND TERMINAL DEVICE

(71) Applicant: GUANGDONG OPPO MOBILE TELECOMMUNICATIONS CORP., LTD., Dongguan (CN)

(72) Inventors: Weijie Xu, Dongguan (CN); Wenhong Chen, Dongguan (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

(21) Appl. No.: 17/121,511

(22) Filed: Dec. 14, 2020

(65) Prior Publication Data
US 2021/0099990 A1    Apr. 1, 2021

Related U.S. Application Data

(63) Continuation of application No. PCT/CN2018/091649, filed on Jun. 15, 2018.

(51) Int. Cl.
| H04H 20/71 | (2008.01) |
| H04W 72/044 | (2023.01) |
| H04W 72/21 | (2023.01) |
| H04W 72/23 | (2023.01) |
| H04W 72/30 | (2023.01) |

(52) U.S. Cl.
CPC ......... *H04W 72/046* (2013.01); *H04W 72/21* (2023.01); *H04W 72/23* (2023.01); *H04W 72/30* (2023.01)

(58) Field of Classification Search
None
See application file for complete search history.

(56) References Cited

U.S. PATENT DOCUMENTS

| 10,554,282 B2* | 2/2020 | Kim .................... H04W 72/563 |
| 2011/0103324 A1* | 5/2011 | Nam .................... H04L 5/0048 |
| | | 370/329 |
| 2011/0149886 A1* | 6/2011 | Xu ........................ H04B 7/0628 |
| | | 370/328 |
| 2011/0212730 A1* | 9/2011 | Wennstrom ........... H04L 5/0091 |
| | | 455/507 |

(Continued)

FOREIGN PATENT DOCUMENTS

| CN | 102137505 A | 7/2011 |
| CN | 102754364 A | 10/2012 |

(Continued)

OTHER PUBLICATIONS

Guangdong OPP Mobile Telecommunications Corp., Ltd., Extended European Search Report, EP18922516.2, dated May 21, 2021, 8 pgs.

(Continued)

*Primary Examiner* — Clemence S Han
(74) *Attorney, Agent, or Firm* — Morgan, Lewis & Bockius LLP

(57) ABSTRACT

A method and device for radio communication is provided, the method comprising: transmitting indication information to a terminal device, the indication information being used for indicating a number or a minimum number of receiving antenna ports that the terminal device is permitted to use.

18 Claims, 4 Drawing Sheets

(56) References Cited

U.S. PATENT DOCUMENTS

| | | | |
|---|---|---|---|
| 2013/0195161 A1* | 8/2013 | Hammarwall | H04B 7/063 375/224 |
| 2013/0215842 A1* | 8/2013 | Han | H04W 72/23 370/329 |
| 2014/0086173 A1* | 3/2014 | Sadeghi | H04W 68/02 370/328 |
| 2014/0153526 A1* | 6/2014 | Mazzarese | H04B 7/024 370/329 |
| 2014/0204765 A1* | 7/2014 | Chai | H04L 5/0032 370/329 |
| 2014/0301306 A1* | 10/2014 | Kim | H04L 5/0046 370/329 |
| 2015/0003359 A1* | 1/2015 | Hoshino | H04W 72/21 370/329 |
| 2015/0009922 A1* | 1/2015 | Hoshino | H04L 5/0053 370/329 |
| 2015/0043372 A1* | 2/2015 | Nagata | H04W 24/08 370/252 |
| 2015/0195822 A1* | 7/2015 | Han | H04J 11/00 370/329 |
| 2015/0223209 A1* | 8/2015 | Seo | H04L 25/0202 370/329 |
| 2015/0304994 A1* | 10/2015 | Kim | H04L 5/0048 370/280 |
| 2015/0318954 A1* | 11/2015 | Park | H04L 27/2602 370/252 |
| 2016/0043849 A1* | 2/2016 | Lee | H04L 5/0053 370/329 |
| 2016/0269084 A1* | 9/2016 | Nam | H04B 7/0469 |
| 2017/0078065 A1* | 3/2017 | Nam | H04L 5/0078 |
| 2017/0086085 A1* | 3/2017 | Ahn | H04W 24/10 |
| 2017/0245142 A1* | 8/2017 | Takahashi | H04B 7/0628 |
| 2017/0289995 A1* | 10/2017 | Lin | H04W 72/23 |
| 2017/0338877 A1* | 11/2017 | Yum | H04B 7/0626 |
| 2018/0124774 A1* | 5/2018 | Takahashi | H04B 7/0645 |
| 2018/0248581 A1* | 8/2018 | Chae | H04W 8/22 |
| 2018/0302139 A1* | 10/2018 | Huang | H04B 7/063 |
| 2019/0081676 A1* | 3/2019 | Wei | H04B 7/088 |
| 2019/0261342 A1* | 8/2019 | Zhang | H04W 72/1278 |
| 2019/0342768 A1* | 11/2019 | Xu | H04B 7/0456 |
| 2019/0349964 A1* | 11/2019 | Liou | H04W 76/27 |
| 2020/0228266 A1* | 7/2020 | Kim | H04B 7/06 |
| 2022/0077999 A1* | 3/2022 | Babaei | H04W 74/02 |

FOREIGN PATENT DOCUMENTS

| | | |
|---|---|---|
| CN | 103840874 A | 6/2014 |
| CN | 105657797 A | 6/2016 |
| CN | 106954241 A | 7/2017 |
| CN | 107231691 A | 10/2017 |
| CN | 107623541 A | 1/2018 |
| CN | 112088549 A | 12/2020 |
| EP | 3002888 A1 | 4/2016 |
| JP | 2017204894 A | 11/2017 |
| JP | 2021-519023 A | 8/2021 |
| KR | 20110093564 A | 8/2011 |
| WO | WO2010064842 A2 | 6/2010 |
| WO | WO2016/164246 A1 | 10/2016 |
| WO | WO2017/171789 A1 | 10/2017 |
| WO | WO2018/031924 A1 | 2/2018 |
| WO | WO2019/237355 A1 | 6/2018 |
| WO | WO2019/184700 A1 | 10/2019 |

OTHER PUBLICATIONS

Guangdong OPP Mobile Telecommunications Corp., Ltd., International Search Report and Written Opinion, PCT/CN2018/091649, dated Jan. 30, 2019, 15 pgs.

Guangdong OPP Mobile Telecommunications Corp., Ltd., Notice of Reasons for Refusal, JP2020-569834, dated Feb. 18, 2022, 10 pgs.

Guangdong OPP Mobile Telecommunications Corp., Ltd., Notification of Reason for Refusal, KR10-20207036227, dated Mar. 2, 2022, 10 pgs.

Guangdong OPP Mobile Telecommunications Corp., Ltd., Examination Report, IN202027054810, dated Dec. 22, 2021, 5 pgs.

Guangdong OPP Mobile Telecommunications Corp., Ltd., Notice of Allowance, KR10-2020-7036227, Sep. 13, 2022, 3 pgs.

Guangdong OPP Mobile Telecommunications Corp., Ltd., EP18922516.2, Notice of Allowance, Jun. 13, 2023, 43 pgs.

Guangdong OPP Mobile Telecommunications Corp., Ltd., CN202210440873.9, First Office Action, Apr. 26, 2023, 24 pgs.

Guangdong OPP Mobile Telecommunications Corp., Ltd., CN202210440873.9, Second Office Action, Jul. 12, 2023, 18 pgs.

Guangdong OPP Mobile Telecommunications Corp., Ltd., CN202210440873.9, Notice of Allowance, Sep. 14, 2023, 3 pgs.

Guangdong OPP Mobile Telecommunications Corp., Ltd., EP23185710.3, Extended European Search Report, Sep. 7, 2023, 9 pgs.

Guangdong OPP Mobile Telecommunications Corp., Ltd., IN202027054810, Indian Patent Hearing Notice, May 21, 2024, 2 pgs.

\* cited by examiner

RADIO COMMUNICATION METHOD, NETWORK DEVICE, AND TERMINAL DEVICE

CROSS-REFERENCE TO RELATED APPLICATION

This application is a continuation application of PCT Patent Application No. PCT/CN2018/091649, entitled "RADIO COMMUNICATION METHOD NETWORK DEVICE, AND TERMINAL DEVICE" filed on Jun. 15, 2018, which is incorporated herein by reference in its entirety.

TECHNICAL FIELD

The present application relates to the field of communications, and more particularly, to a radio communication method, a network device and a terminal device.

BACKGROUND 5G communication technologies have characteristics of large bandwidth, high peak rate, and low delay. For example, in 5G communications, transmission can be executed at a rate of several Gbps or tens of Gbps over hundreds of MHz or even several GHz bandwidth.

Therefore, 5G technologies can support services such as real-time high-definition video live broadcast, high-definition movie download, augmented reality (AR) and virtual reality (VR), which is expected to bring an excellent user experience.

The transmission with large bandwidth and high-rate may bring many challenges to 5G terminals. The large bandwidth may cause sharp increase on power consumption of radio frequency (RF) paths of the terminal, for example, the power consumption of RF devices such as the analog to digital converter (DAC)/digital to analog converter (DAC) ADC/DAC, the power amplifier (PA) and the filter. In addition, the high-rate transmission also requires baseband processing devices of the terminal (such as the filter, the digital signal processor (DSP), and the field-programmable gate array (FPGA)) to operate at high speeds to cause an increase in the power consumption.

SUMMARY

Embodiments of the present application provide a radio communication method and device.

In a first aspect, there is provided a radio communication method, including:

transmitting indication information to a terminal device, the indication information being used for indicating the number or the minimum number of receiving antenna ports that the terminal device is permitted to use.

With reference to the first aspect, in a possible implementation of the first aspect, the method further includes:

receiving a request message transmitted by the terminal, the request message being used for requesting a network device for the number or the minimum number of the receiving antenna ports;

the step of transmitting indication information to a terminal device includes:

transmitting the indication information based on the request message.

With reference to the first aspect or any one of the foregoing possible implementations, in another possible implementation of the first aspect, the request message further carries a cause value for requesting the number or the minimum number of the receiving antenna ports, and/or the desired number or the desired minimum number of the receiving antenna ports.

With reference to the first aspect or any one of the foregoing possible implementations, in another possible implementation of the first aspect, the method further includes:

performing downlink transmission based on the number or the minimum number of the receiving antenna ports.

With reference to the first aspect or any one of the foregoing possible implementations, in another possible implementation of the first aspect, the indication information is carried in a broadcast message or a radio resource control RRC.

With reference to the first aspect or any one of the foregoing possible implementations, in another possible implementation of the first aspect, the broadcast message is remaining minimum system information RMSI, other system information OSI, or physical broadcasting channel PBCH.

With reference to the first aspect or any one of the foregoing possible implementations, in another possible implementation of the first aspect, the step of transmitting indication information to a terminal device includes:

transmitting the indication information to the terminal device according to at least one of the following:

a downlink channel status of the terminal device, a cell coverage condition, battery power of the terminal device, and a service condition of the terminal.

With reference to the first aspect or any one of the foregoing possible implementations, in another possible implementation of the first aspect, the indication information is further used for indicating to the terminal device at least one of the following:

a downlink channel or signal required to be received when downlink reception is performed according to the number or the minimum number of the receiving antenna ports;

A required RRC status when the downlink reception is performed according to the number or the minimum number of the receiving antenna ports;

a channel status of a current downlink channel when the downlink reception is performed according to the number or the minimum number of the receiving antenna ports; and a service condition of the terminal device when the downlink reception is performed according to the number or the minimum number of the receiving antenna ports.

With reference to the first aspect or any one of the foregoing possible implementations, in another possible implementation of the first aspect, the method is used for communication in the following frequency bands:

n7, n38, n41, n77, n78 or n79.

In a second aspect, there is provided a radio communication method, including:

receiving indication information transmitted by a network device, the indication information being used for indicating the number or the minimum number of receiving antenna ports that the terminal device is permitted to use; and performing downlink reception according to the indication information.

With reference to the second aspect, in a possible implementation of the second aspect, the method further includes:

transmitting a request message to the network device, the request message being used for requesting the network device for the number or the minimum number of the receiving antenna ports.

With reference to the second aspect or any one of the foregoing possible implementations, in another possible implementation of the second aspect, the request message further carries a cause value for requesting the number or the minimum number of the receiving antenna ports, and/or the desired number or the desired minimum number of the receiving antenna ports.

With reference to the second aspect or any one of the foregoing possible implementations, in another possible implementation of the second aspect, the indication information is carried in a broadcast message or a radio resource control RRC.

With reference to the second aspect or any one of the foregoing possible implementations, in another possible implementation of the second aspect, the broadcast message is remaining minimum system information RMSI, other system information OSI, or physical broadcasting channel PBCH.

With reference to the second aspect or any one of the foregoing possible implementations, in another possible implementation of the second aspect, the indication information is further used for indicating to the terminal device at least one of the following:

a downlink channel or signal required to be received when downlink reception is performed according to the number or the minimum number of the receiving antenna ports;

A required RRC status when the downlink reception is performed according to the number or the minimum number of the receiving antenna ports;

a channel status of a current downlink channel when the downlink reception is performed according to the number or the minimum number of the receiving antenna ports; and a service condition of the terminal device when the downlink reception is performed according to the number or the minimum number of the receiving antenna ports.

With reference to the second aspect or any one of the foregoing possible implementations, in another possible implementation of the second aspect, the method is used for communication in the following frequency bands:

n7, n38, n41, n77, n78 or n79.

In a third aspect, there is provided a network device, configured to perform the method in the first aspect or any of the implementations thereof.

Specifically, the network device includes functional modules configured to perform the method in the first aspect or any of the implementations thereof.

In a fourth aspect, there is provided a terminal device, configured to perform the method in the second aspect or any of the implementations thereof.

Specifically, the terminal device includes functional modules configured to perform the method in the second aspect or any of the implementations thereof.

In a fifth aspect, there is provided a network device, including a processor and a memory. The memory is configured to store a computer program, and the processor is configured to call and run the computer program stored in the memory to execute the method in the first aspect or any of the implementations thereof.

In a sixth aspect, there is provided a terminal device, including a processor and a memory. The memory is configured to store a computer program, and the processor is configured to call and run the computer program stored in the memory to execute the method in the second aspect or any of the implementations thereof.

In a seventh aspect, there is provided a chip, configured to perform the method in any one of the first to second aspects or any of the implementations thereof.

Specifically, the chip includes: a processor, configured to call and run a computer program from a memory, so that a device installed with the chip performs the method in any one of the first to second aspects or any of the implementations thereof.

In an eighth aspect, there is provided a computer-readable storage medium, configured to store a computer program that causes a computer to perform the method in any one of the first to second aspects or any of the implementations thereof.

In a ninth aspect, there is provided a computer program product, including computer program instructions, which cause the computer to perform the method in any one of the first to second aspects or any of the implementations thereof.

In a tenth aspect, there is provided a computer program which, when run on a computer, causes the computer to perform the method in any one of the first to second aspects or any of the implementations thereof.

DETAILED DESCRIPTION

Technical solutions in embodiments of the present application will be described clearly and completely in conjunction with drawings in the embodiments of the present application.

The technical solutions in the embodiments of the present application will be described below with reference to the accompanying drawings in the embodiments of the present application. Obviously, the described embodiments are part of the embodiments of the present application, but not all of the embodiments. Based on the embodiments in the present application, all other embodiments obtained by a person of ordinary skill in the art without creative efforts shall fall within the protection scope of the present application.

The technical solutions according to the embodiments of the present application may be applied to a variety of communications systems, such as a Global System for Mobile communications ("GSM" for short) system, a Code Division Multiple Access ("CDMA" for short) system, a Wideband Code Division Multiple Access ("WCDMA" for short) system, a General Packet Radio Service ("GPRS" for short) system, a Long Term Evolution ("LTE" for short) system, an LTE Frequency Division Duplex ("FDD" for short) system, an LTE Time Division Duplex ("TDD" for short), a Universal Mobile Telecommunication System ("UMTS" for short), a Worldwide Interoperability for Microwave Access ("WiMAX" for short) communications system, a future 5G system, or the like.

Figure 1:
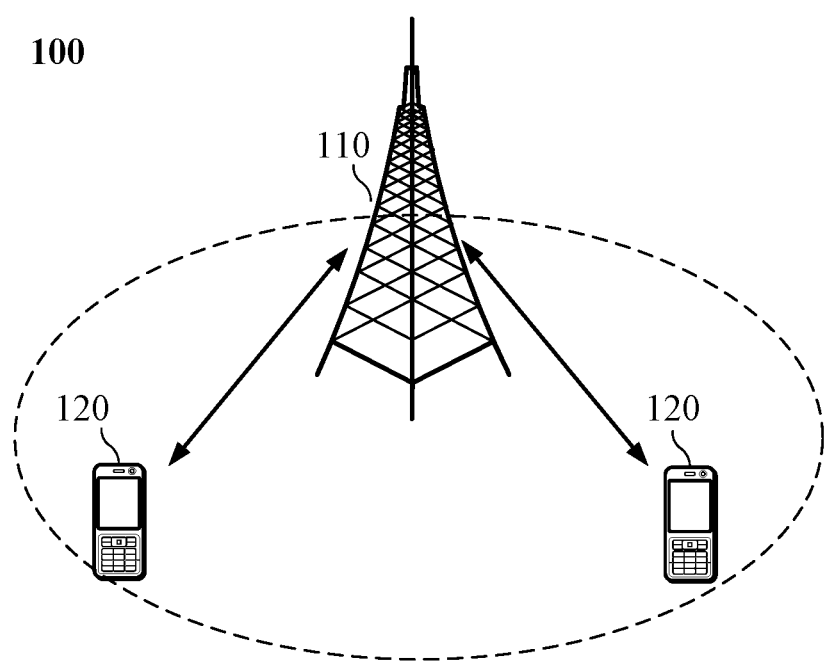
FIG. 1 is a schematic diagram of a communication system according to an embodiment of the present application.

Exemplarily, a communication system 100 applied in an embodiment of the present invention is shown in FIG. 1. The communication system 100 may include a network device 110. The network device 110 may be a device communicating with user equipment (UE) 120 (or referred to as a communication terminal or a terminal). The network device 110 may provide communication coverage to a specific geographic region, and may communicate with UE located within the coverage region. Optionally, the network device 110 may be a base transceiver station (BTS) in a global system for mobile communications (GSM) or a code division multiple access (CDMA) system, or a nodeB (NB) in a wideband code division multiple access (WCDMA) system, or an evolutional node B (eNB or eNodeB) in a long term evolution (LTE) system, or a radio controller in a cloud radio access network (CRAN). Or, the network device may be a mobile switching center, a relay station, an access point, a vehicle device, a wearable device, a concentrator, a switchboard, a network bridge, a router, a network-side device in a 5th generation (5G) network, or a network device in a public land mobile network (PLMN) that will be evolved in the future, and the like.

The communication system 100 further includes at least one UE 120 located within a coverage range of the network device 110. The "UE" used herein includes, but not limited to, connection via a wired line, such as connection via public switched telephone networks (PSTN), a digital subscriber line (DSL), a digital cable, and a direct cable; and/or another data connection/network; and/or via a wireless interface, for example, for a cellular network, a wireless local area network (WLAN), a digital television network such as a DVB-H network, a satellite network and an AM-FM broadcast transmitter; and/or an apparatus of another UE, which is configured to receive/transmit a communication signal; and/or an Internet of things (IoT) device. The UE configured to realize communication through a wireless interface may be referred to as a "wireless communication terminal", a "wireless terminal", or a "mobile terminal". Examples of the mobile terminal include, but not limited to, a satellite or cellular phone, and a personal communications system (PCS) terminal that may combine a cellular radiotelephone with data processing, facsimile, and data communication capabilities; a radiotelephone, a pager, an Internet/intranet access, a Web browser, a notepad, a calendar, and/or a personal digital assistant (PDA) of a global positioning system (GPS) receiver; and a conventional laptop and/or palmtop receiver or other electronic apparatuses including radiotelephone transceivers. The UE may refer to an access terminal, UE, a user unit, a user station, a mobile station, a mobile platform, a remote station, a remote terminal, a mobile device, a user terminal, a terminal, a wireless communication device, a user agent, or a user apparatus. The access terminal may be a cellular phone, a cordless telephone, a session initiation protocol (SIP) telephone, a wireless local loop (WLL) station, a PDA, a handheld device having a wireless communication function, a computation device or other processing devices connected to a radio modem, a vehicle device, a wearable device, UE in a 5G network, or UE in the PLMN that will be evolved in the future, and the like.

Optionally, device to device (D2D) communication may be realized among the UE 120.

Optionally, a 5G system or 5G network may also be referred to as a new radio (NR) system or NR network.

FIG. 1 exemplarily illustrates one network device and two of UEs. Optionally, the communication system 100 may include a plurality of network devices, and a coverage range of each network device may include other numbers of UEs, which is not limited by the embodiment of the present invention.

Optionally, the communication system 100 may also include other network entities such as a network controller and a mobile management entity, which is not limited by the embodiment of the present invention.

It should be understood that a device having a communication function in a network/system in the embodiment of the present invention may be referred to as a communication device. The communication system 100 shown in FIG. 1 is taken as an example. The communication device may include a network device 110 and UE 120 which have communication functions. The network device 110 and the UE 120 may be the above-mentioned specific devices, and descriptions thereof are omitted here. The communication device may also include other devices in the communication system 100, such as other network entities including the network controller, the mobile management entity, and the like, which is not limited by the embodiment of the present invention.

It should be understood that the terms "system" and "network" herein may often be interchanged herein. The term "and/or" herein is only an association relationship that describes associated objects, and represents that there may be three relationships. For example, A and/or B may represent that: A exists alone, A and B exist simultaneously, and B exists alone. In addition, the character "/" herein generally indicates that front and back associated objects are in an "or" relationship.

Figure 2:
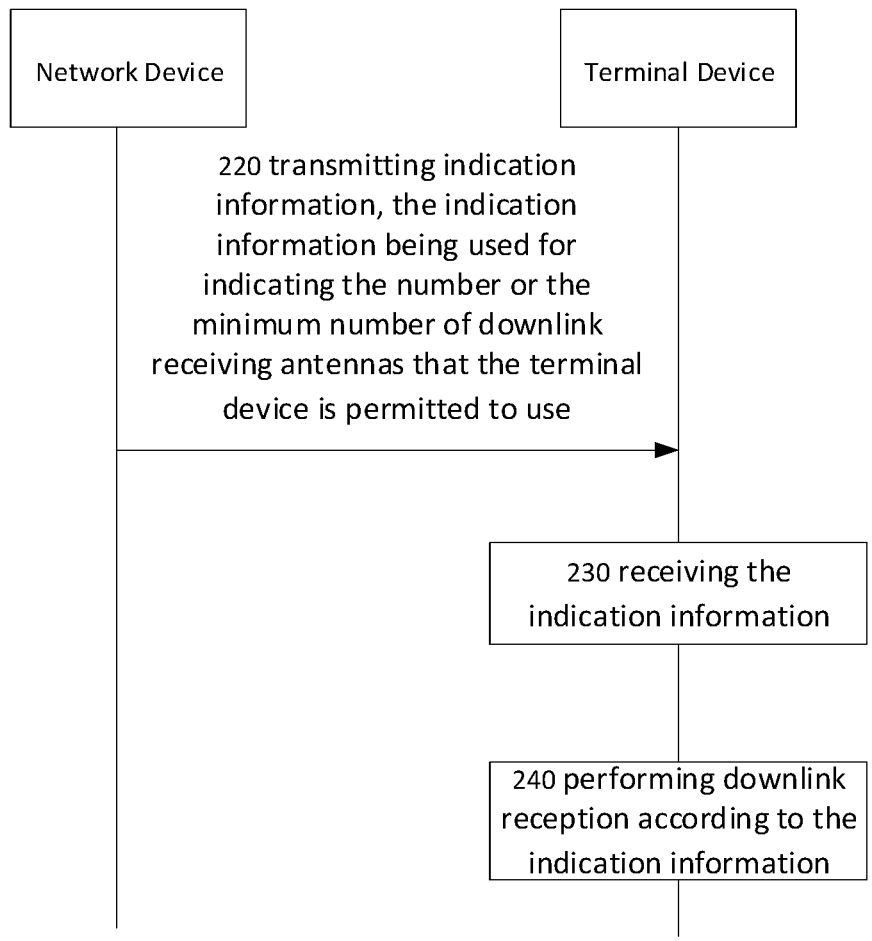
FIG. 2 is a schematic flowchart of a radio communication method according to an embodiment of the present application.

FIG. 2 is a schematic flowchart of a radio communication method 200 according to an embodiment of the present application.

Optionally, the method of the embodiments of the present application may be applied to communication in frequency bands n7, n38, n41, n77, n78 or n79.

Optionally, 5G specifications require that in the frequency bands below 6 GHZ, the terminal device can be equipped with at least 4 receiving antenna ports in the frequency bands n7, n38, n41, n77, n78 and n79 (which can refer to the frequency bands defined in 3GPP release 15 38.101). Since the frequency bands such as n38, n41, n77, n78 may be main frequency bands of 5 GHz, the above requirements mean that 5G terminals need to be equipped with at least 4 receiving antenna ports if they want to support the above frequency bands. LTE terminals are generally equipped with two receiving antenna ports. An increase in the receiving antenna ports means that the UE needs to consume more power, because each of the receiving antenna ports corresponds to one RF path including an antenna, PA, AD/DA, a filter, and even a baseband processing device which all consume power of the terminal. However, in many usage scenarios, the terminal device does not have to use at least 4 receiving antenna ports, otherwise it would cause great power consumption. Therefore, the method of the embodiments of the present application can solve the power consumption problem of the terminal.

Optionally, in the embodiments of the present application, an operating mode in which the terminal device uses fewer receiving antenna ports (less than the own receiving antenna ports) for downlink reception may be referred to as a multi-antenna port fall-back operating mode.

Optionally, in the embodiments of the present application, the receiving antenna ports of the terminal device and the receiving antennas of the terminal device may have a one-to-one correspondence, but the embodiments of the present application are not limited to this. For example, the receiving antenna ports of the terminal device and the receiving antennas of the terminal device may have a one-to-multiple correspondence, which depends on specific implementations, and is not specifically limited in the embodiments of the present application.

In 210, the network device transmits indication information to the terminal device, the indication information being used for indicating the number or the minimum number of receiving antenna ports that the terminal device is permitted to use.

Optionally, the number or the minimum number of the receiving antenna ports indicated by the indication information may be smaller than the number of receiving antenna ports possessed by the terminal device, and may be equal to the number of receiving antenna ports possessed by the terminal device.

For example, if the number of receiving antenna ports possessed by the terminal device is 4, the number of receiving antenna ports indicated by the indication information may be equal to 4 or less than 4.

It should be understood that the indication information indicating the number or the minimum number of receiving antenna ports that the terminal device is permitted to use may be performed in an explicit manner for indication, and for example, the indication information may explicitly carry the number or the minimum number. Alternatively, the number or the minimum number may be indicated in an implicit manner, for example, the number or the minimum number may be indicated by a resource carrying the indication information. Or the network device may receive a request message of the terminal device, and the request message carries the number or the minimum number of receiving antenna ports that are expected to be adopted. If the network device transmits an acceptance message for the request message, the acceptance message may be used as the indication information mentioned above.

Optionally, in the embodiments of the present application, the indication information may be carried in a broadcast message. For example, it may be carried in a physical broadcasting channel (PBCH), remaining minimum system information (RMSI), and other system information (OSI).

It should be understood that the indication information may also be carried in other messages. For example, it may be carried in a radio resource control (RRC) message, which is not specifically limited in the embodiments of the present application.

In 220, the terminal device receives the indication information transmitted by the network device.

In 230, the terminal device performs downlink reception according to the indication information.

Optionally, in the embodiments of the present application, the network device may perform downlink transmission based on the number or the minimum number of receiving antenna ports. When the network device performs the downlink transmission, the number of data transmission layers may be less than or equal to the number or the minimum number.

Specifically, when the network device indicates that the terminal device is allowed to adopt a receiving mode in which the number of receiving antenna ports used is less than the number of receiving antenna ports processed by the terminal device by the indication information, and after the receiving mode takes effect, in the scheduling of the terminal device by the network device, the network device adopts the number of data transmission layers that is less than or equal to the number of receiving antenna ports indicated by the indication information for multiple-input multiple-output (MIMO) transmission.

For example, after the network device indicates the terminal to use 2 receiving antenna ports for reception, data scheduling of the terminal by the network device uses either a single layer of data transmission or a maximum of two layers of MIMO data transmission.

Optionally, in the embodiments of the present application, the terminal device may perform the downlink reception by the number or the minimum number of receiving antenna ports indicated by the indication information.

When the indication information is used for indicating the number of receiving antenna ports, the terminal device may perform the downlink transmission in a manner in which the number of receiving antenna ports is used for downlink reception.

For example, it is assumed that the indication information indicates that the number of receiving antenna ports is 2, the terminal device may use the two receiving antenna ports for downlink reception.

Alternatively, when the indication information is used for indicating the minimum number of receiving antenna ports, the terminal device may perform the downlink reception by using the number of receiving antenna ports which is equal to or greater than the minimum number.

For example, it is assumed that the indication information indicates that the minimum number of receiving antenna ports is 2, the terminal may use 2, 3, or 4 receiving antenna ports for downlink reception.

Therefore, in the embodiments of the present application, the network device indicates to the terminal device the number or the minimum number of the receiving antenna ports used when the downlink reception is performed, instead of always using the maximum number of the receiving antenna ports for the downlink reception, thereby reducing the power consumption during the downlink reception process to achieve a purpose of energy saving, which can extend standby time and use time of the terminal device.

Optionally, in the embodiments of the present application, the terminal device may transmit a request message to the network device, and the request message is used for requesting the network device for the number or the minimum number of the receiving antenna ports. The network device may receive the request message transmitted by the terminal; and transmit the indication information based on the request message.

At this time, the indication information may optionally be carried in a radio resource control (RRC) signaling.

Specifically, the terminal device may transmit the request message to the network device when the terminal device needs to change the current number of receiving antenna ports or will perform the downlink reception or a certain type of downlink reception, and the request message may be used for requesting the network device for the number or the minimum number of the receiving antenna ports. The network device may transmit the indication information based on the request message.

Optionally, in the embodiments of the present application, the request message further carries a cause value for requesting the number or the minimum number of the receiving antenna ports, and/or the desired number or the desired minimum number of the receiving antenna ports.

Specifically, when the terminal device needs to request the network device for the number or the minimum number of receiving antenna ports for a certain reason, it may transmit the cause value of the request and/or the desired number or the desired minimum number of the receiving antenna ports to the network device, whereby the network device can transmit the indication information.

Optionally, in the embodiments of the present application, the number or the minimum number of receiving antenna ports that the terminal device is permitted to use indicated in the indication information transmitted by the network device may be equal to the number or the minimum number of receiving antenna ports desired by the terminal device, or not equal to (e.g., greater than or less than) the number or the minimum number of receiving antenna ports desired by the terminal device.

Specifically, the terminal device supporting the frequency band n7, n38, n41, n77, n78 or n79 needs to support at least 4 receiving antenna ports, but the terminal device does not necessarily use 4 receiving antenna ports in many usage scenarios. For example, in transmission scenarios that only support small data packets, such as short messages, WeChat SMS chats, etc., it is not necessary for the terminal devices to use the 4 receiving antenna ports in these scenarios, because they are all small packets for transmission, receiving performance of using 2 receiving antenna ports is sufficient, and compared to a case of using relatively few receiving antenna ports (such as 2 receiving antenna ports), performance gain of using 4 receiving antenna ports is not obvious. In addition, when the terminal device uses 4 receiving antenna ports for downlink reception, the terminal device needs to use 4 receiving paths to receive and process downlink signals, which will cause great power consumption.

In addition, if the terminal device still uses 4 antenna receiving ports under low battery conditions, it is unfavorable for extending the standby time of the terminal. At this time, it is beneficial to fall back to the operating mode with fewer receiving antenna ports (such as 2 receiving antenna ports) to extend the standby time.

Therefore, in the above scenario, in order to achieve the purpose of saving energy of the terminal device, the terminal device can transmit the request message to the network device to request to fall back to operating mode with low power consumption. For example, in the request message, it is requested to fall back to operating mode with fewer number of receiving antenna ports than the number of receiving antenna ports processed by the terminal device. For example, the terminal with a capability of 4 receiving antenna ports requests to use 2 receiving antenna ports by the request message.

The terminal device may also carry the reason value of the request in the request message, such as low power or low rate service requirements.

After receiving the request message transmitted by the terminal device, the network device may transmit the indication information to the terminal if the network device allows the terminal to enter the low power consumption mode by determination. The indication information indicates that the terminal is allowed to enter the low power consumption mode, and further may indicate the minimum number of receiving antenna ports used by the terminal. For example, for the terminal with 4 receiving antenna ports, when the terminal requests 2 receiving antenna ports by the request message, the network device may indicate the terminal to use at least 2 receiving antenna ports by the indication information. Of course, the network device can also reject the request of the terminal device, and still request the terminal to use the 4 receiving antenna ports to receive downlink information.

Optionally, in the embodiments of the present application, the network device may transmit the indication information according to at least one of the following: a downlink channel status of the terminal device, a cell coverage condition, battery power of the terminal device, and a service condition of the terminal.

After receiving the request message from the terminal device, the network device may generate and transmit the indication information according to at least one of the downlink channel status of the terminal device, the cell coverage condition, the battery power of the terminal device, and the service condition of the terminal.

Alternatively, the network device may not need to receive the request from the terminal device, but may automatically transmit the indication information according to at least one of the downlink channel status of the terminal device, the cell coverage condition and the service condition of the terminal.

Optionally, network coverage can be characterized by a radius of the cell.

If the radius of the cell is small, the terminal device may use fewer receiving antenna ports for the downlink reception. If the request message that the terminal device requests to use fewer receiving antenna ports for reception is received, the request message may be accepted.

Alternatively, if the radius of the cell is large, the terminal device may use more receiving antenna ports for the downlink reception. If the request message that the terminal device requests to use fewer receiving antenna ports for reception is received, the request message may be accepted, the request message may be rejected.

Optionally, the downlink channel status of the terminal device can be characterized by a signal to interference plus noise ratio (SINR).

If the SINR of the downlink channel of the terminal device is large, the terminal device may use fewer receiving antenna ports for the downlink reception. If the request message that the terminal device requests to use fewer receiving antenna ports for reception is received, the request message may be accepted.

Or, if the SINR of the downlink channel of the terminal device is small, the terminal device may use more receiving antenna ports for the downlink reception. If the request message that the terminal device requests to use fewer receiving antenna ports for reception is received, the request message may be accepted, the request message may be rejected.

Optionally, the service condition of the terminal device may be used for indicating whether the service allowed to be transmitted by the terminal device is a small data packet.

If the services of the terminal for a period of time are all small data packets, the terminal device may use fewer receiving antenna ports for the downlink reception. If the request message that the terminal device requests to use fewer receiving antenna ports for reception is received, the request message may be accepted.

Alternatively, if the services of the terminal for the period of time are not all small data packets, the terminal device may use more receiving antenna ports for the downlink reception. If the request message that the terminal device requests to use fewer receiving antenna ports for reception is received, the request message may be accepted, the request message may be rejected.

Optionally, in the embodiments of the present application, the network device may transmit the number or the minimum number of receiving antenna ports that the terminal device is permitted to use in the broadcast message.

For example, in the frequency band n7, n38, n41, n77, n78, or n79, even if the terminal device needs to have at least 4 receiving antenna ports, the network device can still broadcast to the terminal device to use 2 receiving antenna ports to receive the downlink signal.

Optionally, the number or the minimum number of receiving antenna ports indicated in the broadcast message may be determined according to the network coverage and so on mentioned above.

Optionally, in the embodiments of the present application, the indication information is further used for indicating to the terminal device at least one of the following 1), 2), 3), and 4). At this time, the indication information may be carried in the RRC signaling, that is, the indication information for a specific terminal device may also indicate at least one of the above mentioned, or the indication information may also be carried in the broadcast message.

1) a downlink channel or signal required to be received when downlink reception is performed according to the number or the minimum number of the receiving antenna ports.

Specifically, the network device may further inform the terminal which signals or channels can use the fewer receiving antenna ports for reception by the indication information, and/or inform the terminal which signals or channels may use the more receiving antenna ports for reception.

The signals or channels received with fewer receiving antenna ports may be the remaining minimum system information (RMSI), other system information (OSI), a paging message or a random access response (RAR) message Wait.

2) a required RRC status when the downlink reception is performed according to the number or the minimum number of the receiving antenna ports.

Specifically, the network device may further inform the terminal which RRC statuses can use the fewer receiving antenna ports for reception by the indication information, and/or inform the terminal which RRC statuses may use the more receiving antenna ports for reception.

The terminal device in an idle status may use fewer receiving antenna ports for the downlink reception, and the terminal device in a connected status may use more receiving antenna ports for the downlink reception.

3) a channel status of a current downlink channel when the downlink reception is performed according to the number or the minimum number of the receiving antenna ports.

Specifically, the network device may further inform the terminal under what conditions of the channel statuses can use the fewer receiving antenna ports for reception by the indication information, and/or inform the terminal under what conditions of the channel statuses may use the more receiving antenna ports for reception.

When the SINR is greater than or equal to a specific value, the terminal device can use fewer receiving antenna ports for the downlink reception, and when the SINR is less than or equal to the specific value, the terminal device can use more receiving antenna ports for the downlink reception. Optionally, this situation can be applied to a case where the terminal device receives the broadcast message.

In a case where the terminal device uses MIMO for multi-antenna port data transmission, when the SINR is greater than or equal to the specific value, the terminal device can use more receiving antenna ports for the downlink reception, and when the SINR is less than or equal to the specific value, the terminal device may use fewer receiving antenna ports for the downlink reception, because more receiving antenna ports are conducive to MIMO multi-antenna port data transmission in a case with higher SINR.

4) the service condition of the terminal device when the downlink reception is performed according to the number or the minimum number of the receiving antenna ports.

Specifically, the network device may further inform the terminal under what conditions of the services can use the fewer receiving antenna ports for reception by the indication information, and/or inform the terminal under what conditions of the services may use the more receiving antenna ports for reception.

When the services transmitted for a period of time are all small data packets, the terminal device may use fewer receiving antenna ports for the downlink reception. When the services transmitted for a period of time are not all small data packets, the terminal device may use more receiving antenna ports for the downlink reception.

It should be understood that, in the embodiments of the present application, the situations in 1), 2), 3), and 4) above may be used in combination.

For example, for a small cell, the network coverage is typically small, and the SINR of the downlink channel of the terminal device is relatively high. For the terminal in the idle state, it is not necessary to use the 4 receiving antenna ports for the terminal when receiving the paging message or the broadcast messages, and the network device can inform the terminal to use the 2 receiving antenna ports for reception in the broadcast.

Optionally, in the embodiments of the present application, when the terminal device has used fewer receiving antenna ports for the downlink reception, the network device may transmit the indication information to indicate the terminal device to use more receiving antenna ports for the downlink reception.

Alternatively, when the terminal device has adopted more receiving antenna ports for the downlink reception, the network device may transmit the indication information to indicate the terminal device to use fewer receiving antenna ports for the downlink reception.

That is to say, the network device can indicate the number or the minimum number of receiving antenna ports that the terminal device is permitted to use in real time according to the changing situations (for example, a change in the channel status of the terminal or a change in the service, etc.).

Therefore, in the embodiments of the present application, the network device indicates to the terminal device the number or the minimum number of the receiving antenna ports used when the downlink reception is performed, instead of always using the maximum number of the receiving antenna ports for the downlink reception, thereby reducing the power consumption during the downlink reception process to achieve a purpose of energy saving, which can extend standby time and use time of the terminal device.

It should be understood that the embodiments of the present application are not limited to the above method 200 and various embodiments thereof, and the embodiments of the present application may also have other implementations.

For example, the network device may not transmit the indication information to the terminal device, and the terminal device and the network device independently and automatically determine the number or the minimum number of receiving antenna ports used by the terminal device for downlink reception. The network device and the terminal device can independently and automatically determine the number or the minimum number of receiving antenna ports used by the terminal device for downlink reception based on the network coverage, the downlink channel status of the terminal device, the RRC status the terminal device is currently in, the current type of downlink channel or signal, the service condition of the terminal device, and any available factors mentioned in the above method. For a specific implementation, reference may be made to the above description, and for the sake of brevity, no further description is provided here.

Figure 3:
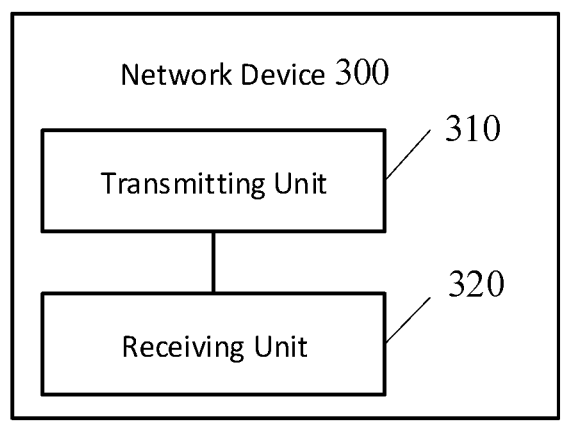
FIG. 3 is a schematic block diagram of a network device according to an embodiment of the present application.

FIG. 3 is a schematic block diagram of a network device according to an embodiment of the present application. As shown in FIG. 3, the network device 310 includes a transmitting unit 310, configured to:

transmit indication information to a terminal device, the indication information being used for indicating the number or the minimum number of receiving antenna ports that the terminal device is permitted to use.

As shown in FIG. 3, the network device 300 further includes a receiving unit 320, configured to:

receive a request message transmitted by the terminal, the request message being used for requesting a network device for the number or the minimum number of the receiving antenna ports;

the transmitting unit 310 is further configured to transmit the indication information based on the request message.

Optionally, in the embodiments of the present application, the request message further carries a cause value for requesting the number or the minimum number of the receiving antenna ports, and/or the desired number or the desired minimum number of the receiving antenna ports.

Optionally, in the embodiments of the present application, the transmitting unit 310 is further configured to:

perform downlink transmission based on the number or the minimum number of the receiving antenna ports.

Optionally, in the embodiments of the present application, the indication information is carried in a broadcast message or a radio resource control RRC.

Optionally, in the embodiments of the present application, the broadcast message is remaining minimum system information RMSI, other system information OSI, or physical broadcasting channel PBCH.

Optionally, in the embodiments of the present application, the transmitting unit 310 is further configured to:

transmit the indication information to the terminal device according to at least one of the following:

a downlink channel status of the terminal device, a cell coverage condition, battery power of the terminal device, and a service condition of the terminal.

Optionally, in the embodiments of the present application, the indication information is further used for indicating to the terminal device at least one of the following:

a downlink channel or signal required to be received when downlink reception is performed according to the number or the minimum number of the receiving antenna ports;

a required RRC status when the downlink reception is performed according to the number or the minimum number of the receiving antenna ports;

a channel status of a current downlink channel when the downlink reception is performed according to the number or the minimum number of the receiving antenna ports; and the service condition of the terminal device when the downlink reception is performed according to the number or the minimum number of the receiving antenna ports.

Optionally, in the embodiments of the present application, the device is used for communication in the following frequency bands:

n7, n38, n41, n77, n78 or n79.

It should be understood that the network device 300 may implement the corresponding functions implemented by the network device in the method of the embodiments of the present application, and for the sake of brevity, details are not described herein again.

Figure 4:
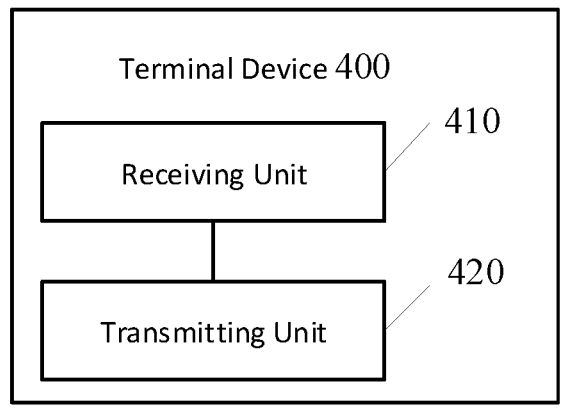
FIG. 4 is a schematic block diagram of a terminal device according to an embodiment of the present application.

FIG. 4 is a schematic block diagram of a terminal device 400 according to an embodiment of the present application. As shown in FIG. 4, the terminal device 400 includes a receiving unit 410, configured to:

receive indication information transmitted by a network device, the indication information being used for indicating the number or the minimum number of receiving antenna ports that the terminal device is permitted to use; and perform downlink reception according to the indication information.

Optionally, as shown in FIG. 4, the device 400 further includes a transmitting unit 420, configured to:

transmit a request message to the network device, the request message being used for requesting the network device for the number or the minimum number of the receiving antenna ports.

Optionally, in the embodiments of the present application, the request message further carries a cause value for requesting the number or the minimum number of the receiving antenna ports, and/or the desired number or the desired minimum number of the receiving antenna ports.

Optionally, in the embodiments of the present application, the indication information is carried in a broadcast message or a radio resource control RRC.

Optionally, in the embodiments of the present application, the broadcast message is remaining minimum system information RMSI, other system information OSI, or physical broadcasting channel PBCH.

Optionally, in the embodiments of the present application, the indication information is further used for indicating to the terminal device at least one of the following:

a downlink channel or signal required to be received when downlink reception is performed according to the number or the minimum number of the receiving antenna ports;

a required RRC status when the downlink reception is performed according to the number or the minimum number of the receiving antenna ports;

a channel status of a current downlink channel when the downlink reception is performed according to the number or the minimum number of the receiving antenna ports; and the service condition of the terminal device when the downlink reception is performed according to the number or the minimum number of the receiving antenna ports.

Optionally, in the embodiments of the present application, the device is used for communication in the following frequency bands:

n7, n38, n41, n77, n78 or n79.

It should be understood that the terminal device 400 may implement the corresponding functions implemented by the terminal device in the method of the embodiments of the present application, and for the sake of brevity, details are not described herein again.

Figure 5:
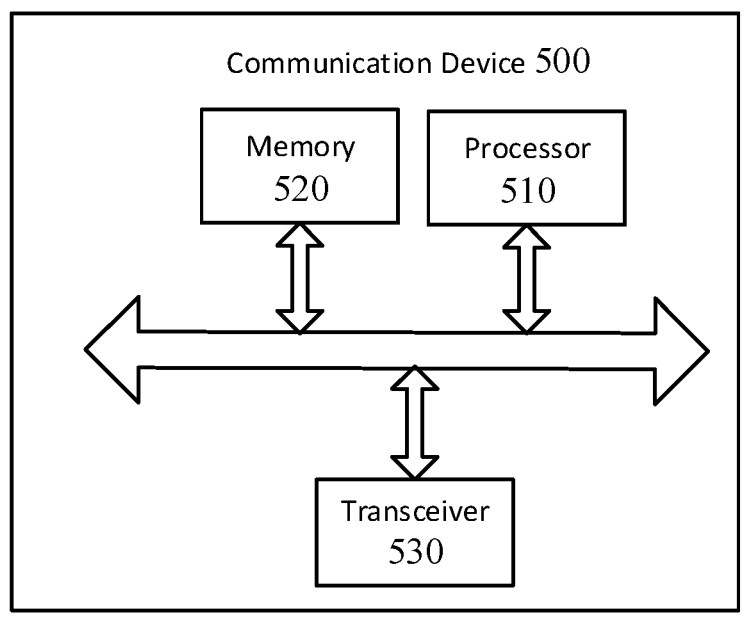
FIG. 5 is a schematic block diagram of a communication device according to an embodiment of the present application.

FIG. 5 is a schematic structural diagram of a communication device 500 according to an embodiment of the present application. The communication device 500 shown in FIG. 5 includes a processor 510. The processor 510 may invoke a computer program from a memory and run the computer program, to implement the method in the embodiments of the present application.

Optionally, as shown in FIG. 5, the communication device 500 may further include a memory 520. The processor 510 may invoke the computer program from the memory 520 and run the computer program, to implement the method in the embodiments of the present application.

The memory 520 may be a component independent of the processor 510, or may be integrated into the processor 510.

Optionally, as shown in FIG. 5, the communication device 500 may further include a transceiver 530. The processor 510 may control the transceiver 530 to communicate with another device, and specifically, the transceiver 530 may transmit information or data to another device, or receive information or data transmitted by another device.

The transceiver 530 may include a transmitter and a receiver. The transceiver 530 may further include an antenna. There may be one or more antennas.

Optionally, the communication device 500 may be the network device in the embodiments of the present application, and the communication device 500 can implement corresponding procedures implemented by the network device in various methods in the embodiments of the present application. For brevity, details are not described herein again.

Optionally, the communication device 500 may be the mobile terminal/terminal in the embodiments of the present application, and the communication device 500 can implement corresponding procedures implemented by the mobile terminal/terminal device in various methods in the embodiments of the present application. For brevity, details are not described herein again.

Figure 6:
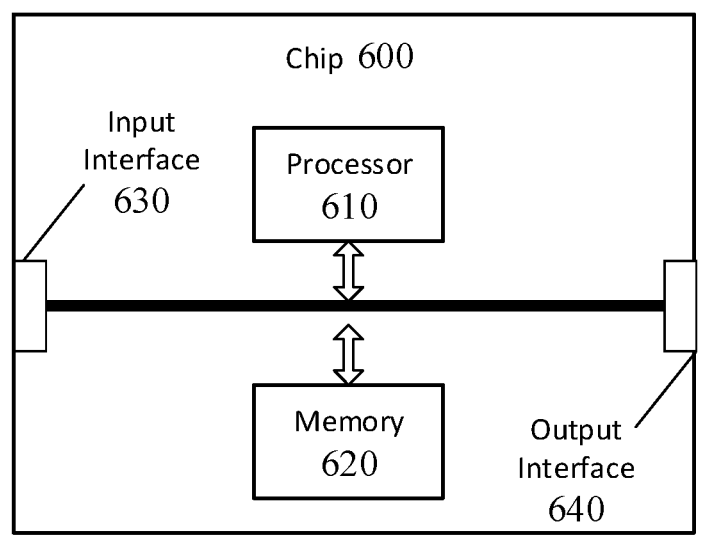
FIG. 6 is a schematic block diagram of a chip according to an embodiment of the present application.

FIG. 6 is a schematic structural diagram of a chip according to an embodiment of the present application. The chip 600 shown in FIG. 6 includes a processor 610. The processor 610 may invoke a computer program from a memory and run the computer program, to implement the method in the embodiments of the present application.

Optionally, as shown in FIG. 6, the chip 600 may further include a memory 620. The processor 610 may invoke the computer program from the memory 620 and run the computer program, to implement the method in the embodiments of the present application.

The memory 620 may be a component independent of the processor 610, or may be integrated into the processor 610.

Optionally, the chip 600 may further include an input interface 630. The processor 610 may control the input interface 630 to communicate with another device or chip, and specifically, the input interface 630 may obtain information or data transmitted by another device or chip.

Optionally, the chip 600 may further include an output interface 640. The processor 610 may control the output interface 640 to communicate with another device or chip, and specifically, the output interface 640 may output information or data to another device or chip.

Optionally, the chip may be applied in the network device according to embodiments of the present application, and the chip can implement corresponding procedures implemented by the network device in various methods in the embodiments of the present application. For brevity, details are not described herein again.

Optionally, the chip may be applied to the mobile terminal/terminal device in the embodiments of the present application, and the chip can implement corresponding procedures implemented by the mobile terminal/terminal device in various methods in the embodiments of the present application. For brevity, details are not described herein again.

It should be noted that, the chip mentioned in the embodiments of the present application may also be referred to as a system-level chip, a system chip, a chip system, a system on chip, or the like.

Figure 7:
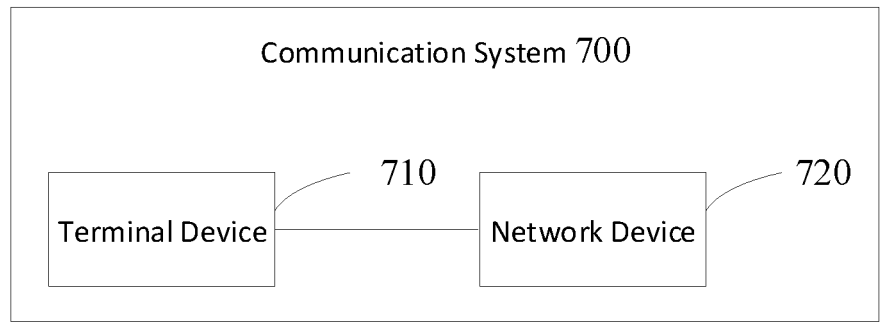
FIG. 7 is a schematic block diagram of a communication system according to an embodiment of the present application.

FIG. 7 is a schematic structural diagram of a communication system 700 according to an embodiment of the present application. The communication system 700 shown in FIG. 7 includes a terminal device 710 and a network device 720.

The terminal device 710 can implement corresponding functions implemented by the terminal device in the foregoing method and the network device 720 can implement corresponding functions implemented by the network device in the foregoing method. For brevity, details are not described herein again.

It should be understood that, the processor of the embodiments of the present application may be an integrated circuit chip, has a signal processing capability, the steps of the foregoing method embodiment may be implemented by using a hardware integrated logic circuit in the processor and/or implemented by using an instruction in a software form. The foregoing processor may be a general purpose processor, a digital signal processor (DSP), a field programmable gate array (FPGA), an application specific integrated circuit (ASIC) or another programmable logic device, a transistor logic device, or a discrete hardware component. The foregoing general purpose processor may be a microprocessor, or may be any conventional processor, or the like. Steps of the methods disclosed with reference to the embodiments of the present invention may be directly executed and completed by means of a hardware decoding processor, or may be executed and completed by using a combination of hardware and software modules in the decoding processor. The software module may be located in a mature storage medium in the field, such as a random access memory, a flash memory, a read-only memory, a programmable read-only memory, an electrically-erasable programmable memory, or a register. The storage medium is located in the memory, and the processor reads information in the memory and completes the steps in the foregoing method embodiments in combination with hardware of the processor.

It should be understood that, the memory in the embodiments of the present application may be a volatile memory or a non-volatile memory, or may include both a volatile memory and a non-volatile memory. The non-volatile memory may be a read-only memory (ROM), a programmable ROM (PROM), an erasable PROM (EPROM), an electrically EPROM (EEPROM), or a flash memory. The volatile memory may be a random access memory (RAM), and is used as an external cache. By way of examples but of no limitation, many forms of RAM are available, for example, a static random access memory (SRAM), a dynamic random access memory (DRAM), a synchronous dynamic random access memory (SDRAM), a double data rate synchronous dynamic random access memory (DDRSDRAM), an enhanced synchronous dynamic random access memory (ESDRAM), a synclink dynamic random access memory (SLDRAM), and a direct Rambus random access memory (DRRAM). It should be noted that, the memory of the system and the method described in this embodiment of the present application is intended to include but is not limited to these memories and any other suitable type of memory.

It should be understood that, the memory is an example but is not intended for limitation. For example, the memory in the embodiments of the present application may alternatively be a static RAM (SRAM), a dynamic RAM (DRAM), a synchronous DRAM (SDRAM), a double data rate SDRAM (DDR SDRAM), an enhanced SDRAM (ESDRAM), a synch link DRAM (SLDRAM), a direct Rambus RAM (DR RAM), and the like. That is, the memory described in this embodiment of the present application is intended to include but is not limited to these memories and any other suitable type of memory.

An embodiment of the present application further provides a computer readable storage medium. The computer readable storage medium is configured to store a computer program.

Optionally, the computer readable storage medium may be applied to the network device in the embodiments of the present application, and the computer program enables a computer to execute a corresponding procedure implemented by the network device in the methods of the embodiments of the present application. For brevity, details are not described herein again.

Optionally, the computer readable storage medium may be applied to the mobile terminal/terminal device in the embodiments of the present application, and the computer program enables the computer to execute a corresponding procedure implemented by the mobile terminal/terminal device in the methods of the embodiments of the present application. For brevity, details are not described herein again.

The present application further provides a computer program product. The computer program product includes a computer program instruction.

Optionally, the computer program product may be applied to the network device in the embodiments of the present application, and the computer program instruction enables the computer to execute a corresponding procedure implemented by the network device in the methods of the embodiments of the present application. For brevity, details are not described herein again.

Optionally, the computer program product may be applied to the mobile terminal/terminal device in the embodiments of the present application, and the computer program instruction enables the computer to execute a corresponding procedure implemented by the mobile terminal/terminal device in the methods of the embodiments of the present application. For brevity, details are not described herein again.

The present application further provides a computer program.

Optionally, the computer program may be applied to the network device in the embodiments of the present application, and when run on a computer, the computer program instruction enables the computer to execute a corresponding procedure implemented by the network device in the methods of the embodiments of the present application. For brevity, details are not described herein again.

Optionally, the computer program may be applied to the mobile terminal/terminal device in the embodiments of the present application, and when run on a computer, the computer program instruction enables the computer to execute a corresponding procedure implemented by the mobile terminal/terminal device in the methods of the embodiments of the present application. For brevity, details are not described herein again.

A person of ordinary skill in the art may be aware that, in combination with the examples described in the embodiments disclosed in this specification, units and algorithm steps may be implemented by using electronic hardware or a combination of computer software and electronic hardware. Whether these functions are executed by means of hardware or software depends on specific applications and design constraints of the technical solutions. A person skilled in the art may use different methods to implement the described functions for each particular application, but it should not be considered that the implementation goes beyond the scope of the present application.

A person skilled in the art may clearly understand that, for simple and clear description, for specific work processes of the foregoing described system, apparatus, and unit, reference may be made to corresponding process in the foregoing method embodiments, and details are not described herein again.

In the several embodiments provided in the present application, it should be understood that the disclosed system, apparatus, and method may be implemented in other manners. For example, the apparatus embodiments described above are merely examples. For example, the unit division is merely logical function division, and there may be other division manners in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electrical, mechanical, or other forms.

The units described as separate parts may or may not be physically separate, and the parts displayed as units may or may not be physical units, may be located in one position, or may be distributed on multiple network units. Some of or all of the units may be selected according to actual needs to achieve the objectives of the solutions of the embodiments.

In addition, functional units in the embodiments of the present application may be integrated into one processing unit, or each of the units may exist alone physically, or two or more units may be integrated into one unit.

When the functions are implemented in the form of a software functional unit and sold or used as an independent product, the functions may be stored in a computer-readable storage medium. Based on such an understanding, the technical solutions of the present application essentially, or the part contributing to the prior art, or some of the technical solutions may be implemented in a form of a software product. The software product is stored in a storage medium, and includes several instructions for instructing a computer device (which may be a personal computer, a server, or a network device) to perform all or some of the steps of the methods described in the embodiments of the present application. The foregoing storage medium includes: any medium that can store program code, such as a USB flash drive, a removable hard disk, a read-only memory (ROM), a random access memory (RAM), a magnetic disk, or an optical disc.

Described above are merely specific implementations of the present application, but the protection scope of the present application is not limited thereto. Changes or replacements readily figured out by any person skilled in the art within the technical scope disclosed in the present application shall be covered by the protection scope of the present application. Therefore, the protection scope of the present application shall be subject to the protection scope of the claims.

What is claimed is:

1. A radio communication method performed at a network device, comprising:
receiving a request message transmitted by a terminal device, wherein the request message carries a desired minimum number of the receiving antenna ports; and
transmitting indication information to the terminal device in response to the request message, the indication information being determined by the network device and being used for indicating a minimum number of receiving antenna ports that the terminal device is permitted to use.

2. The method according to claim 1, wherein the indication information is carried in a broadcast message or a radio resource control.

3. A network device, comprising a processor, a transceiver, and a memory, wherein the memory is configured to store a computer program, and the processor is configured to call and run the computer program stored in the memory, to execute steps of the method according to claim 1.

4. The network device according to claim 3, wherein the indication information is carried in a broadcast message or a radio resource control.

5. A chip, comprising: a processor, configured to call and run a computer program from a memory, so that a device installed with the chip executes the method according to claim 1.

6. A non-transitory computer-readable storage medium, configured to store a computer program, wherein the computer program causes a computer to execute the method according to claim 1.

7. The method according to claim 1, wherein the minimum number of receiving antenna ports indicated by the indication information is equal to 4, or smaller than 2.

8. The method according to claim 1, wherein a number of data transmission layers of downlink transmission is less than or equal to the minimum number.

9. The method according to claim 1, wherein a number of receiving antenna ports used by the terminal for downlink transmission is greater than or equal to the minimum number.

10. A radio communication method performed at a terminal device, comprising:
 transmitting a request message to a network device, wherein the request message carries a desired minimum number of the receiving antenna ports; and
 receiving indication information transmitted by the network device in response to the request message, the indication information being determined by the network device and being used for indicating a minimum number of receiving antenna ports that the terminal device is permitted to use; and
 performing downlink reception according to the indication information.

11. The method according to claim 10, wherein the indication information is carried in a broadcast message or a radio resource control (RRC).

12. A chip, comprising a memory and a processor, configured to call and run a computer program from the memory, so that a device installed with the chip executes the method according to claim 10.

13. A non-transitory computer-readable storage medium, configured to store a computer program, wherein the computer program causes a computer to execute the method according to claim 10.

14. The method according to claim 10, wherein the minimum number of receiving antenna ports indicated by the indication information is equal to 4, or smaller than 2.

15. The method according to claim 10, wherein a number of data transmission layers of downlink transmission is less than or equal to the minimum number.

16. The method according to claim 10, wherein a number of receiving antenna ports used by the terminal for downlink transmission is greater than or equal to the minimum number.

17. A terminal device, comprising: a processor, a transceiver and a memory, wherein the memory is configured to store a computer program, and the processor is configured to call and run the computer program stored in the memory, to cause the terminal device to:
 transmit, by the transceiver, a request message to a network device, wherein the request message carries a desired minimum number of the receiving antenna ports; and
 receive, by the transceiver, indication information transmitted by the network device in response to the request message, the indication information being determined by the network device and being used for indicating a minimum number of receiving antenna ports that the terminal device is permitted to use; and
 perform, by the transceiver, downlink reception according to the indication information.

18. The terminal device according to claim 17, wherein the indication information is carried in a broadcast message or a radio resource control.

* * * * *